US009892085B2

(12) United States Patent
Cvejanovic et al.

(10) Patent No.: US 9,892,085 B2
(45) Date of Patent: Feb. 13, 2018

(54) CONTROL DEVICE FOR I²C SLAVE DEVICE

(71) Applicant: Robert Bosch GmbH, Stuttgart (DE)

(72) Inventors: Dorde Cvejanovic, Munich (DE); Jan Hayek, Munich (DE)

(73) Assignee: ROBERT BOSCH GMBH, Stuttgart (DE)

(*) Notice: Subject to any disclaimer, the term of this patent is extended or adjusted under 35 U.S.C. 154(b) by 190 days.

(21) Appl. No.: 14/929,864

(22) Filed: Nov. 2, 2015

(65) Prior Publication Data
US 2016/0140078 A1 May 19, 2016

(30) Foreign Application Priority Data
Nov. 17, 2014 (DE) .................. 10 2014 223 362

(51) Int. Cl.
G06F 13/42 (2006.01)
G06F 13/364 (2006.01)
G06F 13/40 (2006.01)

(52) U.S. Cl.
CPC ........ *G06F 13/4282* (2013.01); *G06F 13/364* (2013.01); *G06F 13/404* (2013.01); *G06F 2213/0016* (2013.01)

(58) Field of Classification Search
CPC .. G06F 13/4282; G06F 13/364; G06F 13/404; G06F 2213/0016
See application file for complete search history.

(56) References Cited

U.S. PATENT DOCUMENTS

| 6,530,029 | B1 | 3/2003 | Metchev | |
|---|---|---|---|---|
| 8,996,737 | B1* | 3/2015 | Tang | H03M 5/145 710/5 |
| 2006/0095670 | A1* | 5/2006 | Behrendt | G06F 13/4291 711/118 |
| 2010/0185896 | A1* | 7/2010 | Andres | G06F 11/2005 714/5.11 |
| 2011/0087914 | A1* | 4/2011 | Files | G06F 13/4291 713/600 |
| 2012/0173783 | A1* | 7/2012 | Sinykin | G06F 13/4282 710/300 |
| 2015/0347344 | A1* | 12/2015 | Fosse | G06F 13/4291 710/110 |

FOREIGN PATENT DOCUMENTS

| CN | 202 600 693 | 12/2012 |
|---|---|---|
| EP | 16 07 864 | 12/2005 |
| GB | 231 39 87 | 12/1997 |

* cited by examiner

Primary Examiner — Glenn A Auve
(74) Attorney, Agent, or Firm — Norton Rose Fulbright US LLP; Gerard Messina

(57) ABSTRACT

A method for controlling an I²C slave device with the aid of a control device, including: evaluating states on a data line and on a clock line of the I²C bus; and assigning the states on the data line and on the clock line to states in a state diagram, control signals for the I²C slave device being generated with the aid of the control device from the states in the state diagram.

7 Claims, 3 Drawing Sheets

CONTROL DEVICE FOR I²C SLAVE DEVICE

RELATED APPLICATION INFORMATION

The present application claims priority to and the benefit of German patent application no. 10 2014 223 362.3, which was filed in Germany on Nov. 17, 2014, the disclosure of which is incorporated herein by reference.

FIELD OF THE INVENTION

The present invention relates to a method for controlling at least one I²C slave device. The present invention also relates to a control device for at least one I²C slave device.

BACKGROUND INFORMATION

The I²C interface (inter-integrated circuit) uses two bidirectional lines in order to provide communication between one or multiple masters and one or multiple slaves. The two aforementioned lines, the serial data line (SDA) and the serial clock line (SCL), are used to send data and to display the beginning and an end of transactions on the interface or on the bus. A beginning and an end of the transaction are designated as "START" and "STOP". Every slave device on the I²C bus must have a device which detects the START/STOP states and/or sends and/or receives data.

However, the slave device must also distinguish between correct and incorrect transactions and is only permitted to respond to correct transactions. Although the aforementioned illegal transfers do not conform to the I²C specification, they are often used by various microcomputer devices on the market in order to reset all devices on the I²C bus.

Circuits which are already believed to be understood, which are discussed, for example, in U.S. Pat. No. 6,530,029 or CN 202600693, have problems with the aforementioned transfers which do not conform to the standard and may result in states in which the device no longer functions correctly.

A watchdog timer described in EP 1607864 could solve the stated problem. It is possible, however, that some of the transactions will not be detected or will be discarded, which may result in a loss of data.

Another approach, which is provided in GB 2313987, functions only when there is a system clock having a substantially higher frequency in the device, which may be used to oversample the SDA and SCL signals.

SUMMARY OF THE INVENTION

An object of the present invention is therefore to provide a method which supports reliable functioning of I²C slave devices on the I²C bus.

The object is achieved, according to a first aspect, by a method for controlling an I²C slave device, including the steps of:
evaluating states on a data line and on a clock line of the I²C bus;
assigning the states on the data line and on the clock line to states of a state diagram, control signals for the I²C slave device being generated with the aid of the control device from the states in the state diagram.

Advantageously, the method according to the present invention makes it possible to "hide" prohibited or illegal actions on the I²C bus from bus users. If an illegal state occurs on the bus, a reset state is always active. Advantageously, this is easy to implement with the aid of a synchronous circuit. The I²C slave may therefore always function correctly regardless of the illegal action taking place on the I²C bus. In the end, the I²C slave is therefore protected against incorrect responses to the bus, whereby, advantageously, all I²C slave devices connected to the I²C bus profit from the present invention.

According to a second aspect, the object is achieved by a control device for controlling an I²C slave device, including:
a feed from a data line of an I²C bus;
a feed from a clock line of the I²C bus;
the control device being configured to assign states in a state diagram to states on the data line and on the clock line;
control signals for the I²C slave device being generatable from the states in the state diagram.

Refinements of the method and the control device are the subject matter of the further descriptions herein.

One advantageous refinement of the method provides that a start control signal is activated on a first control line if the clock line has a high level and the data line has a falling flank, followed by a falling flank on the clock line. In this way, a control signal for the I²C slave device may be generated, after the transmission of which a valid transfer on the I²C bus is possible.

One advantageous refinement of the method provides that the start control signal is deactivated on the first control line if the clock line has a high level. In this way, a control signal for the I²C slave device may be generated, after the transmission of which a valid transfer on the I²C bus is possible.

One further advantageous refinements of the method provides that a reset control signal is activated on a second control line if a falling flank occurs on the data line and the clock line has a high level. In this way, the reset control signal may be generated, in a defined way, from signal states on lines of the I²C bus.

One further advantageous refinement of the method provides that the reset control signal is deactivated after the start control signal has been generated.

One advantageous refinement of the control device provides that the data line is connected to an input of a first inverter, to an inverted clock input of a second D flip-flop, and to a clock input of a fourth D flip-flop;
an output of the first inverter is connected to a second input of an OR gate;
the clock line is connected to an input of the second D flip-flop, to a reset input of the second D flip-flop, to a clock input of a first D flip-flop, to a data input of the fourth D flip-flop, and to a clock input of a third D flip-flop;
an output of the second D flip-flop is connected to an input of a second inverter, to an input of the third D flip-flop, and to a first input of a NOR gate;
an output of the second inverter is connected to a reset input of the first D flip-flop;
an output of the fourth D flip-flop is connected to a second input of the NOR gate;
an output of the third D flip-flop is connected to a first control line of the I²C slave device, to a first input of an OR gate, and to an input of a third inverter;
an output of the third inverter is connected to a reset input of the fourth D flip-flop;
an output of the OR gate is connected to an input of the first D flip-flop;
an output of the first D flip-flop is connected to an input of a fourth inverter;
an output of the fourth inverter is connected to a reset input of the third D flip-flop; and an output of the NOR gate is connected to a second control line for the I²C slave device.

The present invention is described in detail in the following, including further features and advantages, on the basis of multiple figures. All features are the subject matter of the present invention, irrespective of their representation in the description and in the figures, and irrespective of their back reference in the patent claims.

DETAILED DESCRIPTION

Figure 1:
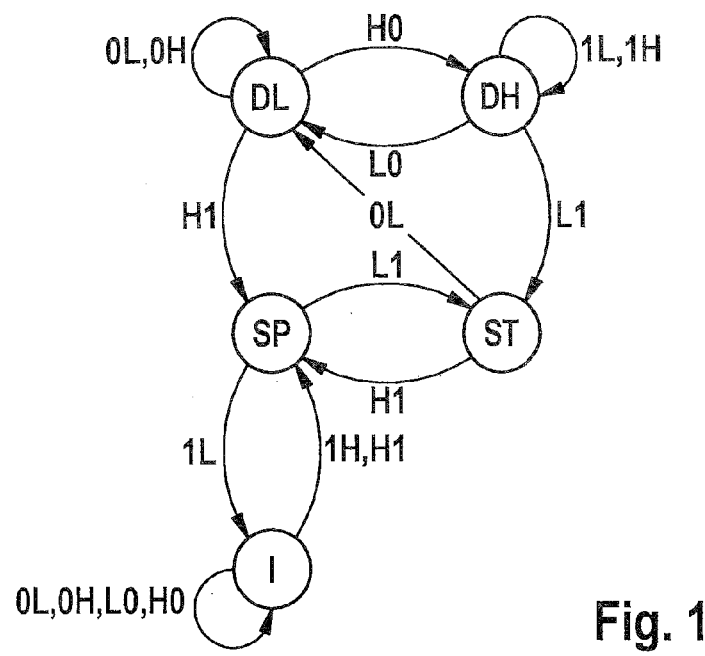
FIG. 1 shows a functional status diagram for illustrating the functional principle of the present invention.

FIG. 1 shows a functional status diagram showing the functional principle of the present invention.

Depicted therein are five different states DL, DH, SP, ST, I, which are permitted to occur due to electrical states on data line SDA and on clock line SCL, the aforementioned states having the following meanings:

DL . . . 0 or GND potential on data line SDA during an on-going data transfer

DH . . . 1 or HIGH potential on data line SDA during an on-going data transfer

SP . . . STOP state is detected on the I²C bus

ST . . . START state is detected on the I²C bus

I . . . illegal state is detected on the I²C bus.

The arrows shown between aforementioned states DL, DH, SP, ST, I depict transitions between the individual states, the first term referring to the state of data line SDA and the second term referring to the state of clock line SCL.

An "L" in the first term represents a falling flank on data line SDA and a "0" in the first term represents a constant low level on data line SDA.

An "H" in the first term represents a rising flank on data line SDA and a "1" in the first term represents a constant high level on data line SDA.

A "0" in the second term represents a constant low level on clock line SCL and a "1" in the second term represents a constant high level on clock line SCL.

An "H" in the second term represents a rising flank on clock line SCL and an "L" in the second term represents a falling flank on clock line SCL.

If a state change does not occur on the SDA and SCL lines, then a transition also does not occur in the status diagram in FIG. 1.

For example, L1 therefore means there is a falling flank on data line SDA and there is a constant HIGH level on clock line SCL.

Figure 2:
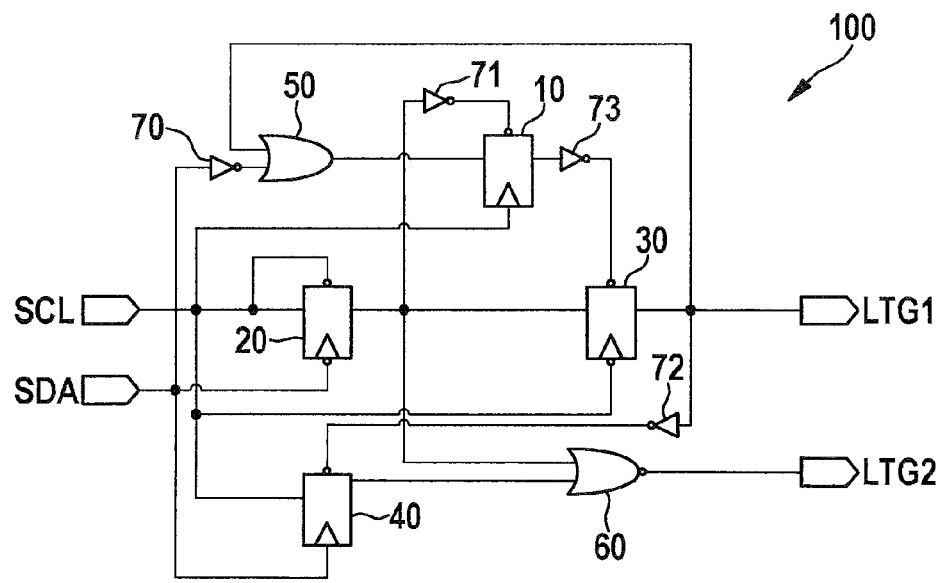
FIG. 2 shows a specific embodiment of a control device according to the present invention.

FIG. 2 shows an exemplary embodiment of a control device 100 according to the present invention for controlling an I²C slave device. Control device 100 is configured as a synchronous logic having D flip-flops, each of which has an asynchronous reset input. The two lines SCL and SDA are apparent, the electrical states or levels of which may be used as stimuli for control device 100.

Data line SDA is routed to an input of a first inverter 70, to an inverted clock input of a second D flip-flop 20, and to a clock input of a fourth D flip-flop 40. Clock line SCL is routed to a data input of second D flip-flop 20, to a reset input of second D flip-flop 20, to a clock input of first D flip-flop 10, to an inverted clock input of third D flip-flop 30 and to a data input of fourth D flip-flop 40.

The output of second D flip-flop 20 is routed to an input of third D flip-flop 30, to an input of a second inverter 71, and to an input of a NOR gate 60. An output of fourth D flip-flop 40 is routed to a second input of a NOR gate 60.

The output of third D flip-flop 30 forms a first control line LTG1, on which a START signal for the I²C slave device (not depicted) is output. The output of third D flip-flop 30 is further routed to a first input of OR gate 50 and also to an input of a third inverter 72. The output of third inverter 72 is routed to a reset input of fourth D flip-flop 40.

The output of first inverter 70 is routed to a second input of OR gate 50, the output of OR gate 50 being routed to a data input of first D flip-flop 10. The output of second inverter 71 is routed to a reset input of first D flip-flop 10. The output of first D flip-flop 10 is routed to an input of a fourth inverter 73, the output of which is routed to a reset input of third D flip-flop 30. The output of third inverter 72 is routed to a reset input of fourth D flip-flop 40.

The output of NOR gate 60 represents a second control line LTG2, on which a reset control signal RESET is provided for the I²C slave device. If at least one of the outputs of second D flip-flop 20 (state ST is detected on the I²C bus) or of fourth D flip-flop 40 (state SP is detected on the I²C bus) is active, NOR gate 60 generates the reset control signal RESET. This means the low-active reset control signal RESET is active only when state ST is detected on the I²C bus or when a bus action which does not conform to the I²C specification occurs on the I²C bus.

In the end, start control signal START is generated with the aid of control device 100 on first control line LTG1 after a correct ST state, i.e., when a falling flank occurs on data line SDA and clock line SCL has a high level, followed by a falling flank on clock line SCL.

Start control signal START is subsequently reset with a HIGH level on clock line SCL. Start control signal START is used for the I²C slave device which may be in order to indicate a valid transfer on the I²C bus.

Reset control signal RESET is generated on second control line LTG2 every time states ST or SP or I have been detected on the I²C bus with the aid of the status diagram in FIG. 1. This means reset control signal RESET is generated every time a falling flank occurs on data line SDA and the clock line has a high level (state ST), or when a rising flank occurs on data line SDA and clock line SCL has a high level (state SP), or when the data line has a high level and a falling flank occurs on the clock line (transition to state I), when state SP is present.

Reset control signal RESET is then reset with the subsequent start control signal START. Reset control signal RESET may therefore be used as an asynchronous reset signal for the I²C slave device.

In the end, start control signal START and reset control signal RESET, which are conveyed to the I²C slave device (not depicted), are controlled in this way with the aid of control device 100.

Second D flip-flop 20 detects the beginning of state ST according to the I²C specification with the aid of a falling flank on data line SDA, while clock line SCL is at a HIGH level.

Third D flip-flop 30 detects the end of state ST on the I²C bus with the aid of a falling flank on clock line SCL after state ST was detected.

Fourth D flip-flop 40 detects state SP according to the I²C specification with the aid of a rising flank on data line SDA, while clock line SCL is at a constant high level.

In this way, it is possible to install the entire control device 100 into a scan chain, thereby supporting cost-effective, automated, digital testing of the entire control device 100, because there is no need to implement any additional tests with scan chain patterns. Advantageously, the implementation of the control device with D flip-flops supports a geometrically small configuration of control device 100.

First D flip-flop 10 generates the reset of start control signal START, whereby the preparations for it are carried out by OR gate 50. OR gate 50 therefore prepares that which is supposed to be sampled by first D flip-flop 10 when a rising flank is conveyed to the clock input of first D flip-flop 10 on clock line SCL.

Control device 100 may also be configured as part of the I²C slave device. In the end, behavior which conforms to the specification is made possible on the I²C bus with the aid of control device 100. In particular, it is possible for the I²C slave device connected to the I²C bus to function properly even if an operation by other bus users connected to the I²C does not conform to the I²C specification.

Figure 3:
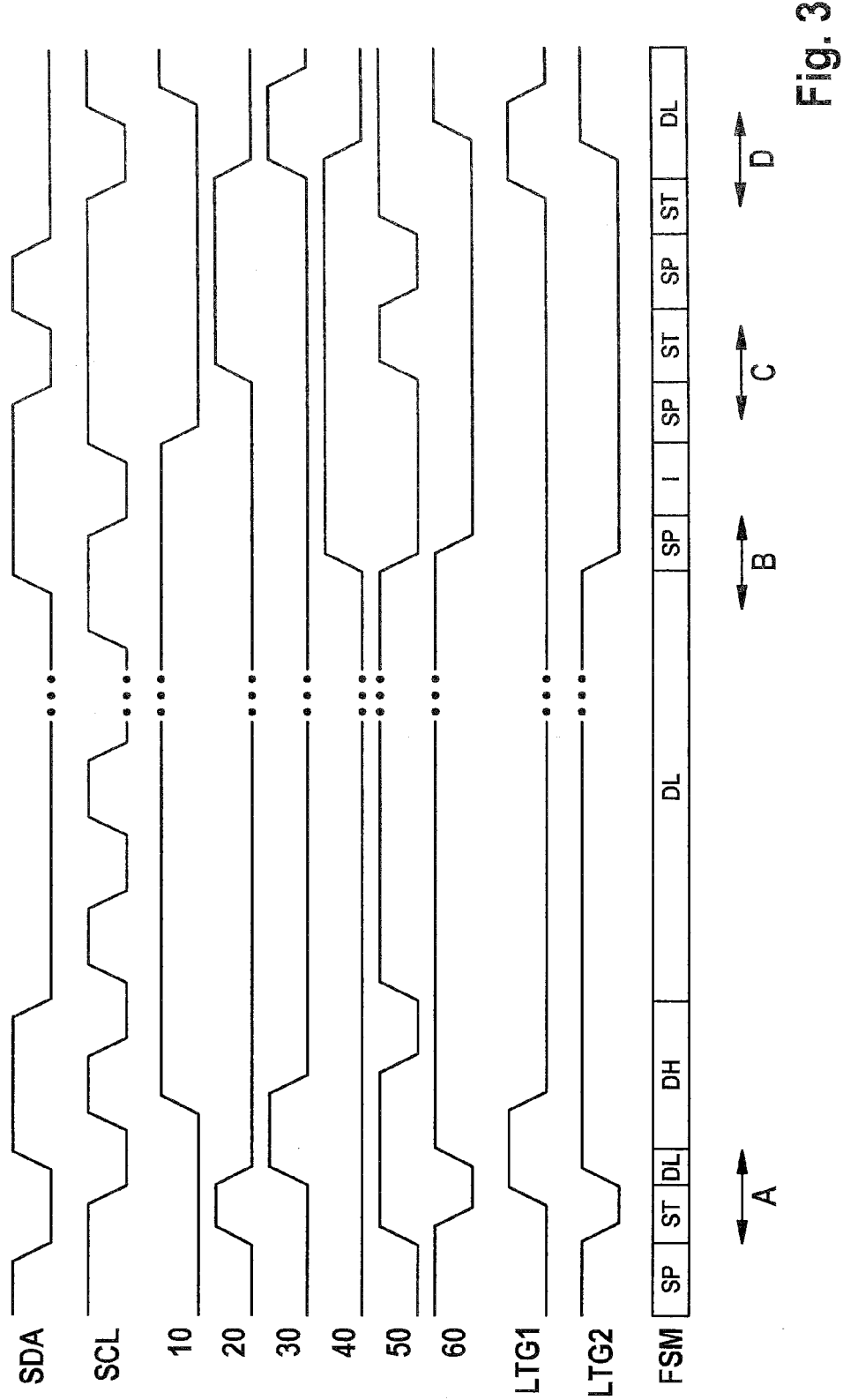
FIG. 3 shows a time diagram of control signals, which are implemented according to the method according to the present invention.

A mode of operation of control device 100 is described in the following on the basis of four scenarios on the I²C bus with reference to FIG. 3. FIG. 3 shows, as an example, a signal behavior over time of the aforementioned components 10 through 60 in response to the stimuli on the SDA and SCL lines.

Depicted underneath FIG. 3 is a state diagram FSM corresponding to the status diagram in FIG. 1, which represents the states on the I²C bus, whereby start control signal START and reset control signal RESET are generated in conformance with the I²C specification.

In the end, the behavior of the START and RESET control signals is configured in such a way that the I²C slave device always responds in a way conforming to the I²C specification, irrespectively of a behavior of signals on the SDA, SCL lines, which possibly does not conform to the specification. As an example of a permitted behavior, it is shown in section A of state diagram FSM that start control signal START is correctly generated, whereby reset control signal RESET is reset.

Reset control signal RESET therefore supports an inactivity of the I²C slave device in the event that a non-specification-compliant action was detected on the I²C bus.

In a section B of state diagram FSM in FIG. 3, it is apparent that the I²C bus switches from state SP to state I, which is an illegal action on the I²C bus. As a result, reset control signal RESET becomes active, i.e., the low-active reset control signal RESET assumes the low level.

Subsequently, a transition from the SP state into the ST state takes place on the I²C bus in a section C, which also does not conform to the I²C specification. In this case, a master or slave connected to the I²C bus, for example, specifies that a state ST be generated which, however, does not conform to the I²C specification. Therefore, control device 100 also does not generate a start control signal START on control line LTG1 in accordance with the I²C specification, and the states of control lines LTG1, LTG2 remain unchanged.

In section D, a permitted transition from state ST into state DL takes place on the I²C bus. Therefore, a start control signal START is also generated on first control line LTG1 and second control line LTG2 is reset, i.e., control line LTG2 assumes a high level.

Figure 4:
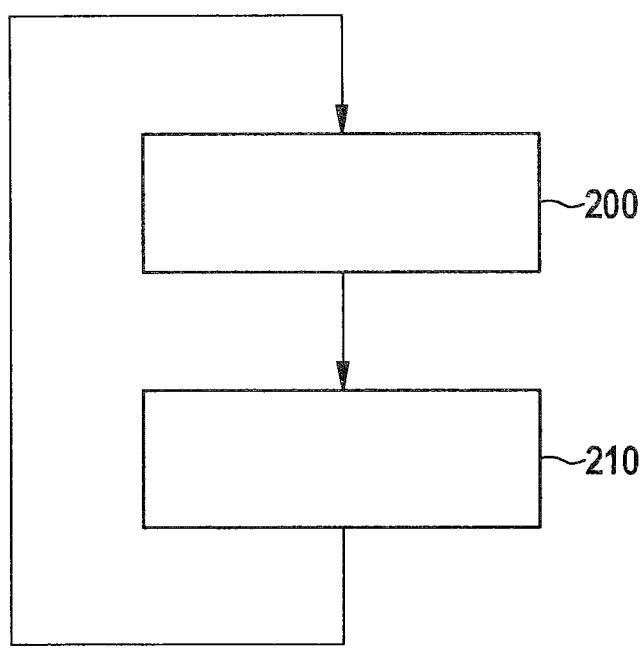
FIG. 4 shows a basic sequence diagram of a specific embodiment of the method according to the present invention.

FIG. 4 shows a basic sequence of a specific embodiment of the method according to the present invention.

In a step 200, an evaluation of states on a data line SDA and on a clock line SCL of the I²C bus is carried out.

In a step 210, an assignment of the states on data line SDA and on clock line SCL to states DL, DH, I, SP, ST in a state diagram FSM is carried out, whereby control signals START, RESET for the I²C slave device are generated with the aid of control device 100 from states DL, DH, I, SP, ST in state diagram FSM.

After step 210, the process returns to step 200, whereby steps 200 and 210 may be executed cyclically.

In summary, the present invention provides a method and a device, which make it possible for a behavior which does not conform to the specification to remain on the I²C bus without adversely affecting the slave devices connected to the I²C bus. Due to the fact that the I²C specification is very stringent and states that some combinations are prohibited on the bus, it is possible, in this way, for a behavior of bus users on the I²C bus to take place free from interference by any type of erratic behavior on the I²C bus.

Advantageously, the switching behavior according to the present invention may be achieved by a large number of alternative circuit variations, which are neither depicted nor described. The variation of the control device in FIG. 2 is therefore understood to be merely an example.

The present invention has a number of advantages:

For example, the control device according to the present invention is robust with respect to interferences or improper uses of the I²C protocol on the I²C bus. Furthermore, it is advantageously not necessary to provide additional external clocks for oversampling the I²C bus for the purpose of detecting states. In addition, an additional RESET control signal is not necessary, except for the PoR (power-on reset). Furthermore, it is possible to use standardized digital elements, such as, e.g., flip flops and logic gates, to implement the control device, which makes it possible to implement the circuit in RTL (Register Transfer Language) such as, e.g., VHDL or Verilog®, and to implement the control device with the use of standard tools. The control device may be tested using standardized scan and IDDQ methods.

Those skilled in the art will also implement non-depicted specific embodiments of the present invention without departing from the core of the present invention.

What is claimed is:

1. A method for controlling an I²C slave device with the aid of a control device, the method comprising:
    evaluating states on a data line and on a clock line of an I²C bus; and
    assigning the states on the data line and on the clock line to states in a state diagram, control signals for the I²C slave device being generated with the aid of the control device from the states in the state diagram,
    wherein a start control signal is activated on a first control line if the data line has a falling edge and the clock line has a high level, followed by a falling edge on the clock line.

2. The method of claim 1, wherein the start control signal is deactivated on the first control line if the clock line has a high level.

3. The method of claim 1, wherein a reset control signal is activated on a second control line if a falling edge occurs on the data line and the clock line has a high level.

4. The method of claim 1, wherein a reset control signal is deactivated on the second control line after the start control signal has been generated.

5. A control device for controlling an I²C slave device, comprising:
   a control arrangement, including:
      a feed from a data line of an I²C bus;
      a feed from a clock line of the I²C bus;
   wherein the control arrangement is configured to assign states in a state diagram to states on the data line and on the clock line, and
   wherein control signals for the I²C slave device are generatable from the states in the state diagram,
   wherein a start control signal is activated on a first control line if the data line has a falling edge and the clock line has a high level, followed by a falling edge on the clock line.

6. The control device of claim 5, wherein the control device is part of the I²C slave device.

7. A control device for controlling an I²C slave device, comprising:
   a control arrangement, including:
      a feed from a data line of an I²C bus;
      a feed from a clock line of the I²C bus;
   wherein the control arrangement is configured to assign states in a state diagram to states on the data line and on the clock line, and
   wherein control signals for the I²C slave device are generatable from the states in the state diagram,
   wherein:
      the data line is connected to an input of a first inverter, to an inverted clock input of a second D flip-flop, and to a clock input of a fourth D flip-flop;
      an output of the first inverter is connected to a second input of an OR gate;
      the clock line is connected to an input of the second D flip-flop, to a reset input of the second D flip-flop, to a clock input of a first D flip-flop, to a data input of the fourth D flip-flop, and to a clock input of a third D flip-flop;
      an output of the second D flip-flop is connected to an input of a second inverter, to an input of the third D flip-flop, and to a first input of a NOR gate;
      an output of the second inverter is connected to a reset input of the first D flip-flop;
      an output of the fourth D flip-flop is connected to a second input of the NOR gate;
      an output of the third D flip-flop is connected to a first control line of the I²C slave device, to a first input of an OR gate, and to an input of a third inverter;
      an output of the third inverter is connected to a reset input of the fourth D flip-flop;
      an output of the OR gate is connected to an input of the first D flip-flop;
      an output of the first D flip-flop is connected to an input of a fourth inverter;
      an output of the fourth inverter is connected to a reset input of the third D flip-flop; and
      an output of the NOR gate is connected to a second control line for the I²C slave device.

* * * * *